US009401876B2

(12) United States Patent
Beecroft et al.

(10) Patent No.: US 9,401,876 B2
(45) Date of Patent: Jul. 26, 2016

(54) METHOD OF DATA DELIVERY ACROSS A NETWORK FABRIC IN A ROUTER OR ETHERNET BRIDGE

(75) Inventors: Jon Beecroft, Bristol (GB); David Charles Hewson, Bristol (GB); Anthony Michael Ford, Bristol (GB); Mark Owen Homewood, Somerset (GB)

(73) Assignee: Cray UK Limited, Reading (GB)

( * ) Notice: Subject to any disclaimer, the term of this patent is extended or adjusted under 35 U.S.C. 154(b) by 215 days.

(21) Appl. No.: 12/990,370

(22) PCT Filed: Apr. 29, 2009

(86) PCT No.: PCT/GB2009/001091
§ 371 (c)(1),
(2), (4) Date: Nov. 17, 2010

(87) PCT Pub. No.: WO2009/133369
PCT Pub. Date: Nov. 5, 2009

(65) Prior Publication Data
US 2011/0170553 A1 Jul. 14, 2011

(30) Foreign Application Priority Data
May 1, 2008 (GB) .................................. 0807937.8

(51) Int. Cl.
*H04L 12/701* (2013.01)
*H04L 12/935* (2013.01)
*H04L 12/931* (2013.01)
(52) U.S. Cl.
CPC .......... *H04L 49/3009* (2013.01); *H04L 49/351* (2013.01); *H04L 2212/00* (2013.01)
(58) Field of Classification Search
CPC .............. H04L 48/3009; H04L 48/351; H04L 2212/0025

USPC .......................................................... 370/401
See application file for complete search history.

(56) References Cited
U.S. PATENT DOCUMENTS
5,872,783 A * 2/1999 Chin ......................... 370/395.32
5,999,531 A 12/1999 Ferolito et al.
(Continued)

FOREIGN PATENT DOCUMENTS
WO WO-2005/038599 A2 4/2005

OTHER PUBLICATIONS
Simpson, W (Editor), rfc1662 PPP in HDLC-like Framing, Jul. 1994, Network Working Group, 25 pages.*
(Continued)

*Primary Examiner* — Brian J Gillis
*Assistant Examiner* — Amy Ling
(74) *Attorney, Agent, or Firm* — Craig J. Lervick; Larkin Hoffman Daly & Lindgren, Ltd.

(57) ABSTRACT

The invention provides an Ethernet bridge or router comprising a network fabric adapted to provide interconnectivity to a plurality of Ethernet ports, each of the Ethernet ports being adapted to receive and/or transmit Ethernet frames, and wherein the Ethernet bridge or router further comprises an encapsulator connected to receive Ethernet Protocol Data Units from the Ethernet ports, wherein the encapsulator is operable to generate a Fabric Protocol Data Unit from a received Ethernet Protocol Data Unit, the Fabric Protocol Data Unit comprising a header portion, and a payload portion which comprises the Ethernet Protocol Data Unit concerned, and wherein the encapsulator is operable to transform Ethernet destination address information from the Ethernet Protocol Data Unit into a routing definition for the network fabric, and to include this routing definition in the header portion of the Fabric Protocol Data Unit. Also provided is a method of data delivery across a network.

20 Claims, 3 Drawing Sheets

(56) References Cited

U.S. PATENT DOCUMENTS

| | | | |
|---|---|---|---|
| 6,633,565 | B1 | 10/2003 | Bronstein et al. |
| 6,707,819 | B1* | 3/2004 | Fraser et al. ............... 370/395.1 |
| 6,788,681 | B1* | 9/2004 | Hurren et al. ................. 370/389 |
| 6,807,172 | B1 | 10/2004 | Levenson et al. |
| 7,499,450 | B2* | 3/2009 | Foglar et al. ................. 370/392 |
| 7,593,328 | B2* | 9/2009 | Yang et al. .................... 370/230 |
| 7,606,229 | B1* | 10/2009 | Foschiano et al. ............ 370/392 |
| 8,477,620 | B2* | 7/2013 | Peterson et al. .............. 370/235 |
| 2001/0043609 | A1* | 11/2001 | Chapman et al. ............. 370/401 |
| 2002/0018475 | A1* | 2/2002 | Ofek et al. .................... 370/400 |
| 2002/0061018 | A1 | 5/2002 | Chien |
| 2002/0083190 | A1 | 6/2002 | Kamiya et al. |
| 2002/0101842 | A1* | 8/2002 | Harrison et al. .............. 370/338 |
| 2002/0165978 | A1* | 11/2002 | Chui .............................. 709/238 |
| 2003/0152182 | A1* | 8/2003 | Pai et al. ....................... 375/372 |
| 2003/0204587 | A1* | 10/2003 | Billhartz ............. H04L 43/0852 709/224 |
| 2004/0184408 | A1 | 9/2004 | Liu et al. |
| 2005/0174941 | A1* | 8/2005 | Shanley et al. ............... 370/235 |
| 2005/0243818 | A1 | 11/2005 | Foglar et al. |
| 2005/0276279 | A1* | 12/2005 | Louis Peschi ................ 370/466 |
| 2006/0146832 | A1* | 7/2006 | Rampal et al. ............ 370/395.5 |
| 2006/0168274 | A1* | 7/2006 | Aloni et al. ................... 709/230 |
| 2006/0187948 | A1 | 8/2006 | Yu |
| 2007/0071014 | A1* | 3/2007 | Perera ................... H04L 49/552 370/396 |
| 2007/0297411 | A1* | 12/2007 | Zhong ........................... 370/392 |
| 2008/0126607 | A1* | 5/2008 | Carr ........................ H04L 47/35 710/29 |
| 2009/0157860 | A1* | 6/2009 | Wittenschlaeger ... H04L 49/254 709/223 |
| 2009/0161669 | A1* | 6/2009 | Bragg et al. .................. 370/389 |
| 2010/0309924 | A1* | 12/2010 | Harrison et al. .............. 370/401 |

OTHER PUBLICATIONS

Mamakos, L. et al. (Editor), rfc2516 A Method for Transmitting PPP Over Ethernet (PPPoE), Feb. 1999, 17 pages.*
Mellanox Technologies Inc, "Introduction to InfiniBand, White Paper", 2003, 20 pages.*
Rfc4391, "Transmission of IP over InfiniBand (IPoIB)", Network Working Group, Apr. 2006, 21 pages.*
Cisco, "Cisco Server Fabric Switch InfiniBand Fabric, White Paper", Nov. 2006, 18 pages.*
Hochmuth, "What's the biggest, fastest LAN switch", Nov. 7, 2006, Computerworld, 7 pages.*
Martini et al., "rfc4448 Encapsulation Methods for Transport of Ethernet over MPLS Networks", Network Working Group, Apr. 2006, 23 pages.*
Fujitsu, "The TCP/IP Protocol Suite", Fujitsu, Dec. 20, 2006, 74 pages.*
"Generic framing procedure (GFP); G.7041/Y.1303 (Aug. 2005)" ITU-T Standard in Force (I), International Telecommunication Union, Geneva, CH, No. G.7041/Y.1303 Aug. 22, 2005, XP017404569.
Rekhter Y et al: "Tag switching architecture overview" Proceedings of the IEEE, IEEE. New York, US, vol. 85, No. 12, Dec. 1, 1997, pp. 1973-1983, XP002965070 ISSN: 0018-9219.
Eric C Rosen Cisco Systems et al: "Tag Switching: Tag Stack Encodings; draft-rosen-tag-stack-00.txt" IETF Standard-Working-Draft, Internet Engineering Task Force, IETF, CH, Nov. 1, 1996, XP015034758 ISSN: 0000-0004.
International Search Report.
Zimmerman, Hubert, OSI Reference Model—the ISO Model of Architecture for Open Systems Interconnection, IEEE Transactions on Communications, Apr. 1980, p. 425-432, vol. Com-28, No. 4.

* cited by examiner

FPDU encapsulation

Control token type 0

Control token type 1

METHOD OF DATA DELIVERY ACROSS A NETWORK FABRIC IN A ROUTER OR ETHERNET BRIDGE

BACKGROUND

Technical Field of the Invention

The present invention generally relates to an Ethernet bridge or router and to a method of data delivery across a network suitable for use in, but not limited to, multi-processor networks such as storage networks, data centres and high performance computing. In particular, the present invention is concerned with an Ethernet bridge or router which is adapted for the distribution of standard IEEE 802 data frames or data frames meeting future Ethernet standards.

Protocol Layers

Conceptually, an Ethernet network is decomposed into a number of virtual layers in order to separate functionality. The most common and formally standardised model used is the Open Systems Interconnect (OSI) reference model. A useful article which described in detail the OSI reference model is "OSI Reference Model—The ISO Model of Architecture for Open Systems Interconnection" by Hubert Zimmermann, IEEE Transactions on Communications, Vol. COM-28, No. 4, April 1980. The OSI reference model comprises seven layers of network system functionality, as follows:

1. Physical Layer is responsible for physical channel access. It consists of those elements involved in transmission and reception of signals, typically line drivers and receivers, signal encoders/decoders and clocks.
2. Data Link Layer provides services allowing direct communication between end-station devices over the underlying physical medium. This layer provides Framing, separating the device messages into discrete transmissions or frames for the physical layer, encapsulating the higher layer packet protocols. It provides Addressing to identify source and destination devices. It provides Error Detection to ensure that corrupted data is not propagated to higher layers.
3. Network Layer is responsible for network-wide communication, routing packets over the network between end-stations. It must accommodate multiple Data Link technologies and topologies using a variety of protocols, the most common being the Internet Protocol (IP).
4. Transport Layer is responsible for end-to-end communication, shielding the upper layers from issues caused during transmission, such as dropped data, errors and mis-ordering caused by the underlying medium. This layer provides the application with an error-free, sequenced, guaranteed delivery message service, managing the process to process data delivery between end stations. Transmission Control Protocol (TCP) and User Datagram Protocol (UDP) are the most commonly recognised Transport Layer protocols.
5. Session Layer is responsible for establishing communications sessions between applications, dealing with authentication and access control.
6. Presentation Layer ensures that different data representations used by machines are resolved.
7. Application Layer provides generic functions that allow user applications to communicate over the network.

For the purposes of this discussion we need not consider operations above the Transport Layer as it should, if well implemented, shield higher layers from issues arising in and below its scope.

Data Unit Encapsulation

As data passes from a user application down through the protocol layers, each layer adds some control information to the data transmission so that the application's peer can properly interpret it at its destination. This process is called 'encapsulation', with each layer taking the information and structure provided to it by a higher layer and adding further layer specific control, as defined by the protocol a layer implements, typically, protocol header and trailers are calculated and added. This combined, layer specific Protocol Data Unit (PDU) is thus passed down the layer stack. Similarly, once the data is received at the destination, layer specific protocol information is stripped from the PDU and interpreted before the PDU is passed on to higher layers in the stack, ultimately arriving in the peer application.

PDUs have specific names at each layer in the stack:
1. Physical Layer refers to the PDU as a symbol stream.
2. Data Link Layer refers to the PDU as a frame.
3. Network Layer refers to the PDU as a packet or datagram.
4. Transport Layer refers to the PDU as a segment or message Network Interconnections A device that implements network services at the Data Link Layer and above is called a 'station'. The Physical Layer is excluded from this definition as it is not addressable by a protocol. There are two types of station:

End Stations are the ultimate source and destination of network data communicated across a network.
Intermediate Stations forward network data generated by End Stations between source and destination. An intermediate station which forwards completely at the Data Link Layer is commonly called a 'Bridge'; a station which forwards at the Network Layer is commonly called a 'Router'.

Ethernet Routing

An intermediate station performs routing operations directing PDUs that appear on one ingress port to another egress port. An intermediate station can operate either at the Data Link Layer, in the case of a Layer 2 intermediate station, or at the Network Layer, in the case of a Layer 3 intermediate station. Layer 2 intermediate stations use the Media Access Control (MAC) address, embedded in the Data Link Layer PDU encapsulation, to control the routing operation. Layer 3 intermediate stations use the IP address, embedded in the Network Layer PDU encapsulation, to direct routing. Layer 3 routing performs a number of steps resulting in the modification of both the source and destination Ethernet segment MAC addresses and thus allows the egress port of the intermediate station to be determined. There are additional operations that need to be performed at ingress in addition to routing to enable Ethernet features such as port security, reserved MAC addresses, VLAN or link aggregate membership. This lengthy sequence of operations is performed at every intermediate station. These operations are costly, usually requiring a large translation mechanism with a number of complex rules to govern the control and management of the translation entries held in the translation tables. The translation mechanism must be capable of sustaining a very high throughput of translations in order to keep up with many ports operating at very high throughput rates. The checking and translation operations can take a great amount of time significantly adding to delivery latency.

As already stated a large network may be constructed from many intermediate stations (bridges or routers) and PDUs being delivered from one end station to another may have to pass through many intermediate stations to complete their delivery. Every intermediate station the PDU passes through must complete the complex address checking and translation operation. This can significantly slow delivery of the frame and increase the power consumption of the whole system.

DESCRIPTION OF RELATED ART

FIG. 1 illustrates a conventional Ethernet bridge 1 with its ports 3 connected to a plurality of individual Ethernet stations 2. In overview, the Ethernet bridge 1 comprises a plurality of ports 3, means for performing Ethernet receive functions 4, means for performing Ethernet transmit functions 5, a packet buffer 6 a crossbar 7. In FIG. 1 only one port 3 is illustrated. However, in practice, each connection to a separate Ethernet station has a respective port with respective receive and transmit functionality.

In US 2004/0131073 a modular scalable switch adapted for the distribution of fast Ethernet frames is described. The Ethernet switch comprises a plurality of individually programmable one-port communication modules which access a common distribution bus. Although described as scalable, this and other Ethernet switches consisting of many separate low port count modules that are dependent upon a common bus, are fundamentally unsuited to networks involving very large numbers of processors such as storage centres and server farms. The number of ports which can be supported within an individual bridge is limited by the bus capacity of these architectures. As the density, capacity and data rates of individual connections increases these common bus architectures limit the construction of large Ethernet networks, bus bandwidth quickly being exceeded by a relatively small number of high performance connections. The present invention seeks to overcome the disadvantages with the above Ethernet switch and other known Ethernet switches and seeks to provide an Ethernet bridge or router and a method of data delivery across a network fabric suitable for use in, but not limited to, multi-processor networks such as storage networks, data centres and high performance computing.

SUMMARY OF THE INVENTION

The present invention therefore provides a single Ethernet bridge or router comprising a network fabric adapted to provide interconnectivity to a plurality of Ethernet ports, each of the Ethernet ports being adapted to receive and/or transmit Ethernet frames, and wherein the Ethernet bridge or router further comprises an encapsulator connected to receive Ethernet Protocol Data Units from the Ethernet ports, wherein the encapsulator is operable to generate a Fabric Protocol Data Unit from a received Ethernet Protocol Data Unit, the Fabric Protocol Data Unit comprising a header portion, and a payload portion which comprises the Ethernet Protocol Data Unit concerned, and wherein the encapsulator is operable to transform Ethernet destination address information from the Ethernet Protocol Data Unit into a routing definition for the network fabric, and to include this routing definition in the header portion of the Fabric Protocol Data Unit.

In a further aspect the present invention provides a method of data delivery across a network comprising a network fabric adapted to provide interconnectivity to a plurality of Ethernet ports, each of the ports being adapted to receive and/or transmit Ethernet data frames, the method comprising the steps of:
  receiving an Ethernet frame or packet;
  generating a Fabric Protocol Data Unit from the received Ethernet Protocol Data Unit, the Fabric Protocol Data Unit comprising a header portion and a payload portion, wherein the payload portion comprises Ethernet destination address information and the header portion comprises a routing definition for the network fabric derived from the Ethernet destination address;
  transmitting the Fabric Protocol Data Unit from an ingress network port of the network fabric to at least one egress network port of the network fabric;
  extracting the Ethernet frame or packet from the Fabric Protocol Data Unit; and
  delivering the Ethernet frame or packet to an Ethernet device.

In a yet further aspect the present invention provides an Ethernet bridge or router comprising a network fabric adapted to provide interconnectivity to a plurality of Ethernet ports, each of the Ethernet ports being adapted to receive and/or transmit Ethernet frames, and wherein the Ethernet bridge or router further comprises software instructions for operating an encapsulator to generate a Fabric Protocol Data Unit from a received Ethernet Protocol Data Unit, the Fabric Protocol Data Unit comprising a header portion, and a payload portion which comprises the Ethernet Protocol Data Unit concerned, and wherein the encapsulator is operable to transform Ethernet destination address information from the Ethernet Protocol Data Unit into a routing definition for the network fabric, and to include this routing definition in the header portion of the Fabric Protocol Data Unit.

In a preferred embodiment the network fabric comprises a plurality of switches and a plurality of network ports adapted to receive and/or transmit the FPDU directly to an egress network port, without de-encapsulation or re-encapsulation of the Ethernet PDU whereby the Ethernet PDU of the FPDU is invisible to the switches of the network bridge fabric.

Ideally, the network fabric is adapted so as not to modify any part of the payload of the FPDU.

Preferably, each one of the network ports is allocated a destination number which is representative of the physical position of the network port on the network fabric whereby algorithmic routing of the FPDU across the network is enabled.

More preferably, each of the plurality of Ethernet ports is programmable and adapted to support automatically both Ethernet PDUs and proprietary FPDUs, the ports automatically interpreting either protocol when it is received.

With the present invention, the encapsulation means implements a new protocol layer additional to the protocol layers of the OSI model for Ethernet networks, the new protocol layer being stacked between the Physical Layer and the Data Link Layer of the OSI model for Ethernet networks and provides for encapsulation of network layer PDUs and data link layer PDUs in the FPDU.

In a further preferred embodiment the encapsulation means is adapted to allow for the payload of an FPDU to be interrupted for the insertion of one or more control tokens.

In a further preferred embodiment the encapsulation means is adapted to allow for the removal or replacement of control tokens previously inserted into the payload of an FPDU.

In the context of this document reference to an intermediate station is intended to also encompass a station capable of forwarding a protocol encapsulation at a point between the Data Link Layer and the Physical Layer. This type of intermediate station will be referred to as a 'Bridge Fabric' later in this document. A multi-port Bridge Fabric may be implemented by a collection of 'Bridge Fabric Switches' (BFS) interconnected by 'Bridge Fabric Switch Links' (BFSL).

Thus, with the present invention a method for Ethernet encapsulation is provided which enables improved routing and data delivery across a network fabric, without change to the underlying Ethernet protocol structures or contents. This provides, amongst other things, the mechanism to guarantee the order of Ethernet data delivered across such a network that includes multiple paths between source and destination endpoints, completely removing the possibility of mis-ordering or duplication being propagated by the network, enabling the construction of very high port count Ethernet Bridges and Routers.

The foregoing and other objects, aspects and advantages will be better understood from the following detailed description of a preferred embodiment of the present invention with reference to the drawings, in which:

DETAILED DESCRIPTION OF THE PREFERRED EMBODIMENT

The Ethernet bridge or router described below introduces an additional protocol layer, referred to herein as an 'Encapsulation Layer', that appears between the Physical Layer and the Data Link Layer of the standard OSI model which can encapsulate both Network Layer and Data Link Layer PDUs.

Complete encapsulation in a PDU unique to the present invention, which is referred to herein as a 'Fabric Protocol Data Unit' (FPDU), avoids the necessity of modifying the underlying PDU frame headers or trailers, and thus removes the overhead of recalculating the cyclic redundancy check (CRC) or other derived information based upon the contents of the frame. A FPDU is used in implementation of the data transmission, acknowledgement and flow-control mechanisms and can be further utilised to provide many other attractive features important to large high performance, scalable Ethernet networks.

Figure 1:
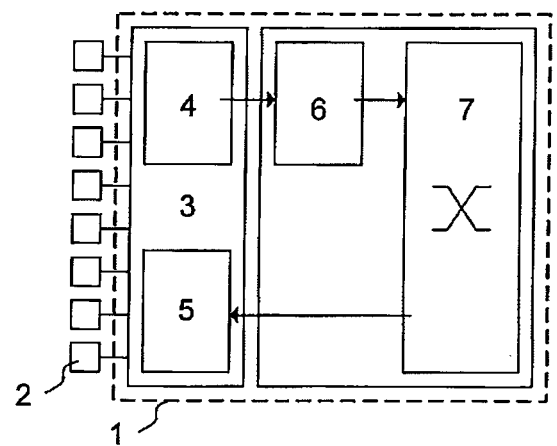
FIG. 1 illustrates schematically an Ethernet bridge of the prior art.
Figure 2:
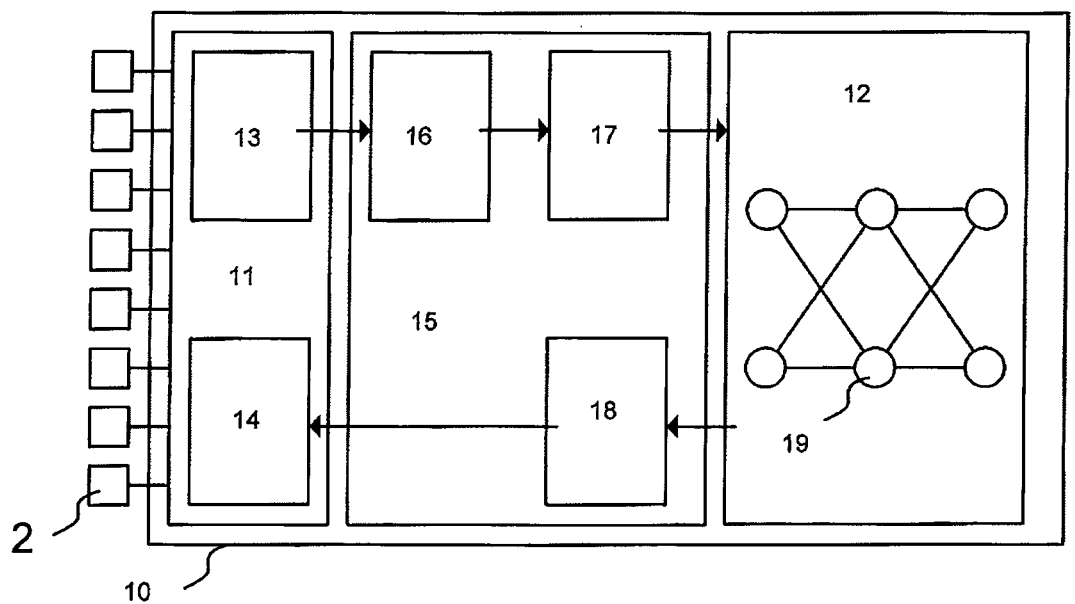
FIG. 2 illustrates schematically an Ethernet bridge in accordance with the present invention.

An Ethernet bridge or router 10 is illustrated in FIG. 2 which may be connected to a plurality of separate Ethernet stations 2 and which implements the encapsulation of both Network Layer and Data Link Layer PDUs in a FPDU. The Ethernet bridge 10 generally comprises a network 12 in combination with a plurality of Ethernet ports 11 (only one is illustrated for the sake of clarity) with each port being individually connectable to an Ethernet station. The Ethernet ports 11 are generally conventional in design and each includes means for establishing a data connection with an Ethernet station, a receiving means 13 for performing Ethernet receive functions 13 and a transmitting device 14 for performing Ethernet transmit functions.

The Ethernet ports 11 are connected to a network interface 15 which provides conventional functionality such as packet buffering 16. However, the network interface 15 additionally includes an Ethernet PDU encapsulator 17 which connects the network interface 15 to ingress ports (not shown) of the network 12 and an Ethernet PDU decapsulator 18 which connects egress ports (not shown) of the network 12 back to the Ethernet ports 11. The Ethernet PDU encapsulator 17 implements the protocol of the Encapsulation Layer and thus is responsible for the generation of the FPDUs. Ideally, each port 11 of the Ethernet bridge 10 has a respective network interface 15 and thus a respective Ethernet PDU encapsulator 17 and a respective Ethernet PDU decapsulator 18.

In the embodiment of the Ethernet bridge 10 illustrated in FIG. 2 all of the ports of the Ethernet bridge 10 are Ethernet ports. However, it is envisaged that the ports of the Ethernet bridge 10 may be programmable to function as either Ethernet ports or proprietary ports which provide for connection of the bridge 10 to non-Ethernet compatible devices.

Figure 3:
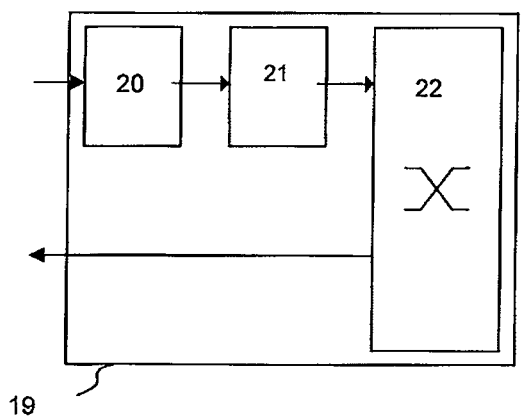
FIG. 3 illustrates schematically a network fabric element used in the Ethernet bridge of FIG. 2.

The network 12, which is a proprietary network, comprises a plurality of interconnected network fabric elements 19 in the form of bridge fabric switches (BFSs) interconnected by bridge fabric switch links (BFSLs). The details of the interconnections of the BFSs are not of relevance to the present invention. In FIG. 3 the structure of one of the network fabric elements 19 is illustrated in greater detail. Thus the network fabric element 19 includes a crossbar 22 the input to which is fed via means for performing frame buffering 20 and means for selecting a crossbar route. The network fabric element 19 may, of course, include additional processing elements as required by the proprietary network 12.

Figure 4:
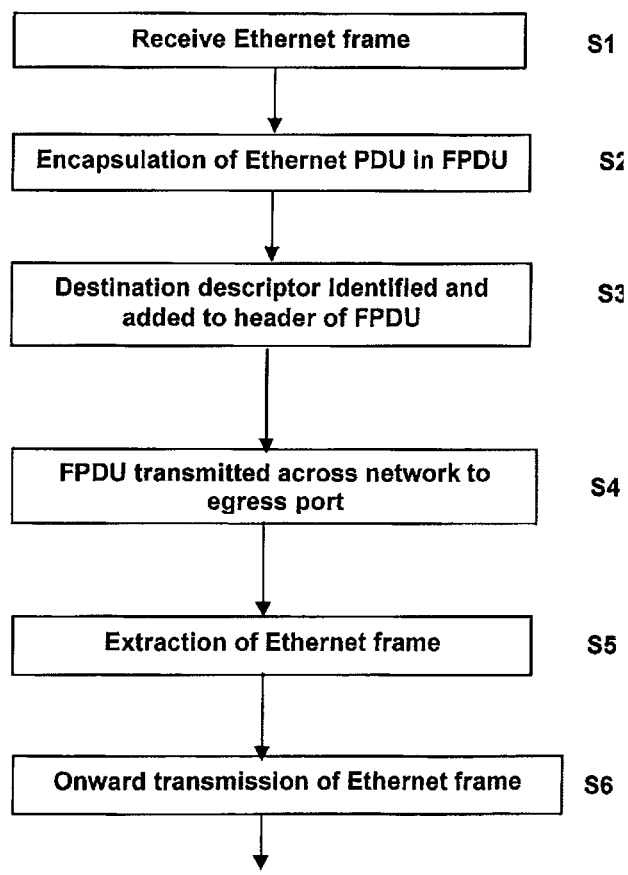
FIG. 4 is a flow diagram of a method of data delivery across a network in accordance with the present invention.

A method of data delivery across the network fabric 12 which implements the protocol of the Encapsulation Layer is illustrated in FIG. 4. Encapsulation occurs at ingress to the Ethernet bridge 10. An Ethernet PDU transmitted by an Ethernet station 2 is received S1 at a port 11 of the Ethernet bridge 10 and is communicated via the receiving device 13, which performs conventional Ethernet receiving functions, to the network interface 15 and in particular the Ethernet PDU encapsulator 17. The encapsulator 17 attaches S2 a FPDU header to the Data Link Layer frame. Also, the encapsulator 17 extracts addressing information from within the Ethernet PDU and transforms the addressing information into a destination descriptor S3 that identifies the complete route through the network fabric 12 to the required destination for the PDU. This destination descriptor is then added to the FPDU header. The data is then communicated S4 to an ingress port of the network fabric 12 and is transmitted across the network 12 via a plurality of network fabric elements 19 to an egress port of the network. At egress from the network 12 the FPDU information is stripped S5 by the Ethernet PDU decapsulator 19 so that only the original Ethernet PDU remains. The unmodified Ethernet PDU is then forwarded S6 to an Ethernet station which is the required destination for the PDU. Thus, the protocol and mechanisms enabling transport of the data across the network 12 are completely contained within the network and are invisible to the Ethernet stations at both ingress and egress.

FPDU encapsulation of the entire Ethernet PDU enables significantly improved speed of delivery of Ethernet frames across the network fabric, and reduced latency, because the Ethernet PDU content is not required to be inspected or modified in any way during delivery across the network. This comes from simplified routing and the possibility to introduce additional delivery controls to maximise the utilisation of the bridge fabric infrastructure.

Part of the new encapsulation may include control tokens. These tokens are multiplexed onto the BFSL along with the encapsulated Ethernet PDU. That is to say, the tokens may interrupt the payload of an FPDU which is in the process of being delivered across the network. Thus encapsulation of the Ethernet PDU also improves the delivery latency of the control tokens by allowing them to be inserted within the encapsulated Ethernet PDU. A large PDU can take microseconds to be transmitted. Allowing the tokens to briefly interrupt the encapsulated Ethernet PDU has little effect on the delivery time of the FPDU but reduces the delivery time of the token from multiple microseconds to tens of nanoseconds.

Figure 5:
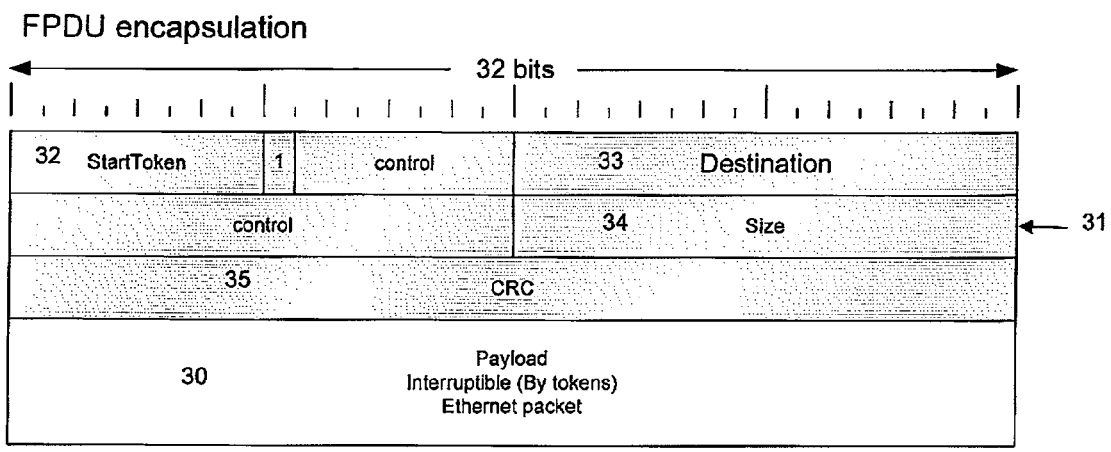
FIG. 5 illustrates the format of an FPDU used in the method in accordance with the present invention.
Figure 6:
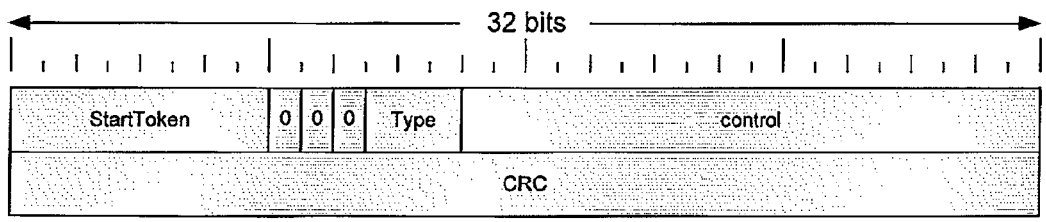
FIGS. 6 and 7 illustrate the format of control tokens used in the method in accordance with the present invention.
Figure 7:
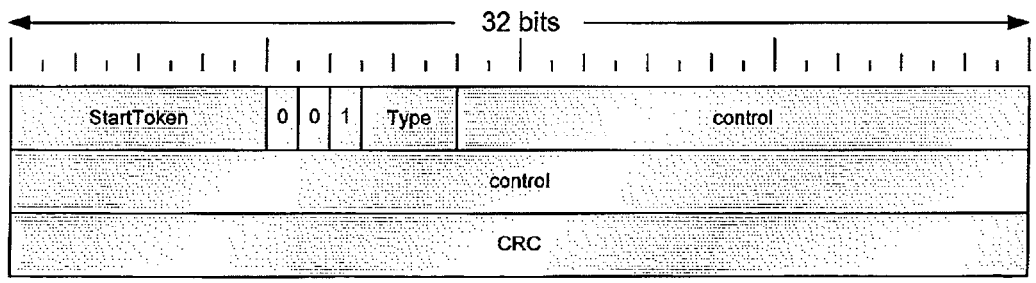

The control tokens are used to give additional information that help with the delivery of the encapsulated Ethernet PDUs. This includes line flow control and Ethernet delivery acknowledgement. It can also be used for sideband operations such as fetching address translations, verifying the fabric has been correctly cabled up and exchanging congestion information. The content of an FPDU is illustrated in FIG. 5. In the case of FIG. 5 the FPDU comprises a payload 30 consisting of an interruptible Ethernet packet. The header 31 to the payload 30 comprises various network specific data including, but not limited to, a start token 32, a destination address 33, the size of the payload 34 and CRC 35. Having a CRC in the FPDU header guarantees the header's validity allowing it to be used without having to wait for the rest of the encapsulated payload to arrive. Various different types of control tokens may, of course, be implemented for use with the network described herein. Furthermore, such control tokens may range from one or two word tokens up to five or more word tokens depending upon the control functionality required. In FIGS. 6 and 7 two different types of control token which are suitable for use with the Ethernet bridge described herein, are illustrated.

A PDU will have to cross many links in a large BFS. Each time the PDU arrives at a new bridge or router the new destination port must be determined quickly from the route information. As mentioned earlier, for Ethernet protocols the route information is held in either the MAC address at Layer 2 or the IP address at Layer 3 and as already stated the translation process is complex and can significantly add to the routing latency. Adding the new encapsulation allows the translation of the MAC address or the IP address to be performed only once for each PDU crossing the BFS.

Usually there is little or no correlation between the physical location of end stations and the addresses used to identify them within the network. This is true when the end station is identified by an IP or MAC address. The new encapsulation includes a destination descriptor or route identifier, the value of which has been assigned to correlate to the physical locations of the Ethernet ports of the entire BFS. This enables interval routing to be performed and means that a PDU crossing the network can use a simple algorithmic approach to selecting an output port. The complex translation of the MAC and IP address only needs to be performed once on ingress to the BFS.

The Ethernet bridge or router described herein is truly scalable offering from 256 ports or fewer up to 48,000 ports or more. A single Ethernet bridge or router using the method described herein is capable of providing greatly increased connectivity in comparison to conventional Ethernet bridges. For example, currently the largest 10 Gbe Ethernet bridges (which are modular in construction) offer only 288 ports. With the Ethernet bridge of the present invention, which is capable of operating at 10 Gbe or above, a single bridge is capable of offering 48,000 ports.

It is to be understood that various modifications to the preferred embodiment and the generic principles and features described herein will be readily apparent to those skilled in the art. Thus, the present invention is not intended to be limited to the embodiment shown and such modifications and variations also fall within the spirit and scope of the appended claims.

The invention claimed is:

1. A method of data delivery across a network comprising a network fabric configured to provide interconnectivity to a plurality of Ethernet ports, the method comprising steps of:

receiving an Ethernet frame or packet at one of the plurality of Ethernet ports, the Ethernet frame or packet comprising an Ethernet Protocol Data Unit having Ethernet destination address information;

generating a Fabric Protocol Data Unit from the received Ethernet Protocol Data Unit, the Fabric Protocol Data Unit comprising a header portion and a payload portion, wherein the payload portion carries the Ethernet Protocol Data Unit, which includes the Ethernet destination address information, and the header portion comprises a destination descriptor for the network fabric derived from the Ethernet destination address which identifies the complete route across the network fabric, wherein while generating the Fabric Protocol Data Unit, one or more control tokens is added to the Fabric Protocol Data Unit, the one or more control tokens is used to provide information related to line flow control, to communicate Ethernet delivery acknowledgement, to fetch address translations, to verify fabric cabling and to exchange congestion information;

transmitting the Fabric Protocol Data Unit from an ingress network port of the network fabric to at least one egress network port of the network fabric using the destination descriptor and without extracting the Ethernet Protocol Data Unit wherein fabric comprises a plurality of switches, and wherein the Ethernet Protocol Data Unit is neither de-encapsulated or re-encapsulated by any of the switches;

at the at least one egress port, extracting the Ethernet frame or packet from the Fabric Protocol Data Unit; and delivering the Ethernet frame or packet to an Ethernet device.

2. The method of claim 1, wherein the network fabric further comprises a plurality of network ports and wherein during the step of transmitting the Fabric Protocol Data Unit the Ethernet Protocol Data Unit is neither de-encapsulated or re-encapsulated by any of the network ports.

3. The method of claim 2, wherein during the step of transmitting the Fabric Protocol Data Unit the Ethernet Protocol Data Unit of the Fabric Protocol Data Unit is invisible to the switches of the network fabric.

4. The method of claim 3, wherein during the step of transmitting the Fabric Protocol Data Unit no part of the payload of the Fabric Protocol Data Unit is modified.

5. The method of claim 2, wherein each one of the network ports is allocated a destination number which is representative of the physical position of the network port on the network fabric whereby the Fabric Protocol Data Unit is transmitted across the network using algorithmic routing.

6. The method of claim 1, wherein the plurality of Ethernet ports are programmable and adapted to support automatically both Ethernet Protocol Data Units and proprietary Fabric Protocol Data Units whereby during the step of receiving an Ethernet frame the Ethernet ports automatically interpret either protocol.

7. The method of claim 1, wherein the step of generating a Fabric Protocol Data Unit implements a new protocol layer additional to the protocol layers of the Open Systems Interconnect model for Ethernet networks.

8. The method of claim 7, wherein the new protocol layer is stacked between the Physical Layer and the Data Link Layer of the Open Systems Interconnect model for Ethernet networks and provides for encapsulation of network layer Protocol Data Units and data link layer Protocol Data Units in the Fabric Protocol Data Unit.

9. The method of claim 1, further comprising the step of replacing or removing one or more control tokens previously inserted into a Fabric Protocol Data Unit.

10. The Method of claim 1 wherein extracting the Ethernet Frame comprises stripping the header from the Fabric Protocol Data Unit leaving the Ethernet Frame or Packet for delivery to the Ethernet Device.

11. An Ethernet bridge or router comprising:
a network fabric configured to provide interconnectivity to a plurality of Ethernet ports, each of the Ethernet ports being configured to receive and/or transmit Ethernet frames; wherein the Ethernet bridge or router further comprises software instructions for operating an encapsulator to generate a Fabric Protocol Data Unit from a received Ethernet Protocol Data Unit, the Fabric Protocol Data Unit comprising a header portion, and a payload portion which comprises the Ethernet Protocol Data Unit concerned, and wherein the encapsulator transforms Ethernet destination address information from the Ethernet Protocol Data Unit into a destination descriptor for the network fabric, and includes this destination descriptor in the header portion of the Fabric Protocol Data Unit, and
wherein the encapsulator further inserts one or more control tokens to the Fabric Protocol Data Unit, the one or more control tokens used to provide information related to line flow control, to communicate Ethernet delivery acknowledgement, to fetch address translations, to verify fabric cabling and to exchange congestion information.

12. The Ethernet bridge or router of claim 11, wherein the encapsulator transforms Ethernet destination address information from the Ethernet Protocol Data Unit into the destination descriptor which defines a set of complete routes for the Fabric Protocol Data Unit through the network fabric, wherein the encapsulator further transmits the Fabric Protocol Data Units to the network fabric, such that the Fabric Protocol Data Unit is transmitted across the fabric to a selected Ethernet Port.

13. An Ethernet bridge or router, comprising:
a plurality of Ethernet ports, each of the Ethernet ports being adapted to receive and/or transmit Ethernet Protocol Data Units;
a network fabric configured to provide interconnectivity between the plurality of Ethernet ports, the network fabric having a plurality of switches and a plurality of network ports;
an encapsulator connected to receive the Ethernet Protocol Data Units from the Ethernet ports, the encapsulator generates a Fabric Protocol Data Unit from the received Ethernet Protocol Data Unit, the Fabric Protocol Data Unit comprising a header portion, and a payload portion which comprises the Ethernet Protocol Data Unit concerned, wherein the encapsulator further transforms Ethernet destination address information from the Ethernet Protocol Data Unit into a destination descriptor which defines a complete route for the Fabric Protocol Data Unit through the network fabric, wherein the network fabric is thus capable of receiving and/or transmitting the Fabric Protocol Data Unit directly through the network fabric to an egress network port using the destination descriptor, without de-encapsulation or re-encapsulation of the Ethernet Protocol Data Unit, wherein the encapsulator includes the destination descriptor in the header portion of the Fabric Protocol Data Unit, and wherein the encapsulator inserts of one or more control tokens to the Fabric Protocol Data Unit, the one or more control tokens is used to provide information related to line flow control, to communicate Ethernet delivery acknowledgement, to fetch address translations, to verify fabric cabling and to exchange congestion information.

14. The Ethernet bridge or router of claim 13, wherein the Ethernet Protocol Data Unit of the Fabric Protocol Data Unit is invisible to the switches of the network fabric.

15. The Ethernet bridge or router of claim 14, wherein the network fabric is adapted so as not to modify any part of the payload of the Fabric Protocol Data Unit.

16. The Ethernet bridge or router of claim 13, wherein each of the network ports is allocated a destination number which is representative of the physical position of the network port on the network fabric thereby enabling algorithmic routing of the Fabric Protocol Data Unit across the network.

17. The Ethernet bridge or router of claim 13, wherein the plurality of Ethernet ports are programmable and adapted to support automatically both Ethernet Protocol Data Units and proprietary Fabric Protocol Data Units, the ports automatically interpreting either protocol when it is received.

18. The Ethernet bridge or router of claim 13, wherein the encapsulator implements a new protocol layer additional to the protocol layers of the Open Systems Interconnect model for Ethernet networks.

19. The Ethernet bridge or router as claimed in claim 18, wherein the new protocol layer is stacked between the Physical Layer and the Data Link Layer of the Open Systems Interconnect model for Ethernet networks and provides for encapsulation of network layer Protocol Data Units and data link layer Protocol Data Units in the Fabric Protocol Data Unit.

20. The Bridge or Router of claim 13 wherein the header from the fabric Protocol Data Unit can be stripped to accommodate delivery of the Ethernet Protocol Data Units to the Ethernet port.

* * * * *